United States Patent

[11] 3,615,681

| [72] | Inventors | James W. DuRoss<br>Claymont;<br>William H. Knightly, Wilmington, both of Del. |
|---|---|---|
| [21] | Appl. No. | 775,128 |
| [22] | Filed | Nov. 12, 1968 |
| [45] | Patented | Oct. 26, 1971 |
| [73] | Assignee | Atlas Chemical Industries, Inc.<br>Wilmington, Del. |

[54] YEAST-RAISED BAKED PRODUCTS AND METHOD FOR PREPARING SAME
6 Claims, No Drawings

| [52] | U.S. Cl. | 99/91 |
|---|---|---|
| [51] | Int. Cl. | A21d 2/16 |
| [50] | Field of Search | 99/91, 90, 118 |

[56] References Cited

UNITED STATES PATENTS

| 2,132,417 | 10/1938 | Harris | 99/92 |
|---|---|---|---|
| 3,111,409 | 11/1963 | Jackson et al. | 99/91 |

FOREIGN PATENTS

| 664,047 | 1/1952 | Great Britain | 99/91 |
|---|---|---|---|

Primary Examiner—Raymond N. Jones
Assistant Examiner—James R. Hoffman
Attorneys—Kenneth E. Mulford, Roger R. Horton and Ernest G. Almy ABSTRACT: A yeast-raised baked product containing a surfactant blend comprising a monoglyceride and polyglycerol esters of higher fatty acids. In the preparation of the final baked product the surfactant blend may be carried by the shortening or added directly to the dough or sponge in the batch method of preparation or to the liquid brew or sponge in the continuous bread-making process.

YEAST-RAISED BAKED PRODUCTS AND METHOD FOR PREPARING SAME

This invention relates to yeast-raised baked products. More particularly, this invention relates to yeast-raised baked products containing surfactant which conditions the dough prior to the baking of the product and which inhibits the staling of the finished baked product. This invention further relates to methods of preparing yeast-raised baked products, including processes of continuous breadmaking.

The "staling" of bread and similar yeast-leavened products is commonly believed to comprise chemical and physical changes which occur in the finished product upon storage under normal conditions until used. The factors contributing to such chemical and physical changes in the finished product are known to be complex and varied; even yet, not all of the contributing factors are completely understood. Whatever may be the causes of the "staling" of yeast-raised baked goods upon storage, however, is is known that the incorporation of certain surfactants into the dough prior to baking will inhibit firming of the finished product, i.e., will retard staling. Moreover, such agents frequently improve the dough condition which facilitates the handling of the dough in the baking process. Notwithstanding that known antistaling agents exist and are normally used in the production of yeast-raised baked goods, notably the monoglycerides, or more commonly, a mixture of mono- and diglycerides, and antistaling and dough conditioning agent is desired which may be used at reduced levels or concentrations in the preparation of the baked product to produce comparable or superior results in the finished product and which is adaptable to both the batch and continuous breadmaking processes.

It is, accordingly, an object of the present invention to provide means for producing yeast-raised baked goods having superior antistaling characteristics.

It is another object of the present invention to provide a yeast-raised baked product containing a surfactant composition which effectively conditions the dough of yeast-raised baked goods prior to baking to facilitate handling thereof.

It is another object of the present invention to provide a yeast-raised baked product containing a surfactant composition suitable for use in the continuous production of bread which excellently conditions the bread dough formed therein to improve its workability in the process and which effectively retards the staling of the final baked product.

All of the foregoing objects and still further objects of the present invention may be accomplished by adding to the ingredients of the yeast-leavened baked product a novel blend of surfactants which is characterized by the presence of a lipophilic surfactant and a hydrophilic surfactant.

The lipophilic surfactant which is a constituent of the surfactant blend used in accordance with the present invention is comprised by a class of monoesters or mixed monoesters and diesters of glycerine and a fatty acid, hereinafter referred to simply as "monoglycerides". In general, any monoglyceride may be used as a constituent of the surfactant blend used in accordance with the method of the present invention. However, although all are functional, it is preferred, for convenience of handling only, to use those monoglycerides having an iodine value within the range of about 30 to about 50. Typical monoglyceride compositions suitable for use in accordance with the present invention are, for example, a mixture of monoglycerides and diglycerides (Ca. 55 percent alpha mono) formed from fatty acids from a blend of cottonseed oil and fully hydrogenated cottonseed oil, having an iodine value of about 51, a mixture of monoglycerides and diglycerides (Ca. 56 percent alpha mono) formed from fatty acids from a blend of lard and tallow having an iodine value of about 47 and a mixture of monoglycerides and diglycerides (Ca. 56 percent alpha mono) formed from fatty acids from partially hydrogenated tallow having an iodine value of about 35.

The fatty acid monoglycerides suitable for use in accordance with this invention may be prepared by conventional methods of glycerolysis of edible fats and oils, i.e., by reacting glycerine with a fatty acid glyceride or other fatty acid ester, or by directly esterifying glycerine with a fatty acid having from about 12 to about 22 carbon atoms. Examples of the fatty acid monoglycerides which may be used as the monoglyceride constituent of the surfactant blend of the present invention are glycerol monostearate, glycerol monooleate and glycerol monopalmitate. While monoglycerides may be used alone, the monoglycerides and diglycerides are generally so closely associated and so expensive to separate that ordinarily mixtures of monoglycerides and diglycerides are used as the active monoglyceride constituent of the surfactant blend used in accordance with the method of this invention. Throughout this specification, the term "monoglyceride" is used to denote not only the monoglyceride alone but mixtures of monoglycerides and diglycerides as well.

The hydrophilic surfactant which is a constituent of the surfactant blend useful in the preparation of baked goods in accordance with this invention comprises a class of fatty acid esters of polyglycerols. The polyglycerols from which said esters are made may be formed by the alkaline condensation of glycerol and comprise chains of glycerol units of varying length and number. In general, polyglycerols from which polyglycerol esters of fatty acids useful in the practice of this invention may be prepared contain not fewer than about 5 moles of glycerine nor more than about 15 moles of glycerine per mole of polyglycerol. Such polyglycerols may themselves be prepared according to the methods described and exemplified in the U.S. Pat. No. 2,132,417, to Benjamin R. Harris, issued Oct. 11, 1938, hereby incorporated by reference.

The fatty acid esters of the aforesaid polyglycerols comprise both the complete esters and the partial esters of said polyglycerols, although for reasons of convenience and economy, the partial esters thereof are preferred. In general, the said polyglycerol esters may be prepared by conventional methods of direct esterification or interesterification using triglyceride fats and are formed from fatty acids having from about 12 to about 22 carbon atoms. The aforesaid fatty acids may comprise both saturated fatty acids and unsaturated fatty acids, the former of which are typically exemplified by lauric acid, stearic acid, palmitic acid, behenic acid and myristic acid and the latter of which are similarly typically exemplified by lauroleic acid, myristoleic acid, oleic acid, ricinoleic acid and linoleic acid. The polyglycerol esters which constitute an essential part of the surfactant blend useful in the preparation of baked goods in accordance with the present invention may be prepared by methods variously disclosed, described and exemplified in the U.S. Pat. No. 2,132,417, to Benjamin R. Harris, cited above, and the U.S. Pat. No. 3,230,090, to Theodore J. Weiss issued Jan. 18, 1966, hereby incorporated by reference.

The surfactant blend useful in the preparation of yeast-raised baked products according to the method of the present invention may easily be prepared by mixing with suitable agitation a monoglyceride of the kind hereinbefore described and a polyglycerol ester of a fatty acid having from about 12 to about 22 carbon atoms of the kind likewise hereinbefore described. The resulting blend is usually, although not necessarily, a plastic mass which is easily dispersed in the dough or in the shortening. In the continuous bread-making process, the blend may be dispersed in liquid brew or liquid sponge or in the shortening which is generally added to the brew or liquid sponge concurrently with the flour to form the premix dough. The surfactant blend may comprise as high an amount as about 80 percent by weight monoglyceride and as little an amount as about 20 percent by weight polyglycerol fatty acid ester or as little an amount as about 40 percent by weight monoglyceride and as high an amount as about 60 percent weight polyglycerol fatty acid ester.

The surfactant blend, when used in a method of continuous bread-making according to the present invention, may also be dispersed in a liquid emulsion which may be metered into the blending tank or brew tank if desired. Optionally, the surfactant blend is incorporated into the bread dough within a range of about 0.15 percent to about 1.0 percent based upon the weight of the flour in the dough and preferably within a range of about 0.25 percent to about 0.5 percent based upon the weight of said flour.

EXAMPLES 1-10

In the examples which follow bread was prepared using a variety of monoglyceride/polyglycerol fatty acid ester surfactant blends and the results with respect to softness of the bread after 6 days compared with those obtained with a control bread containing no surfactant and a comparison bread containing monoglyceride alone. The monoglycerides used were: mono- and diglycerides of fat-forming fatty acid (Ca. 54 percent alpha mono) from hydrogenated edible tallow, hereinafter designated monoglyceride A and mono- and diglycerides of fat-forming fatty acid (Ca. 56 percent alpha mono) from a lard-tallow blend, hereinafter designated monoglyceride B.

The following bread formula and procedures were utilized to evaluate the various monoglyceride/polyglycerol fatty acid ester blends and the control and comparison breads:

BREAD FORMULA

| Sponge | Grams | % (Flour as 100) |
|---|---|---|
| Flour | 865.0 | 65.0% |
| Water | 493.0 | 37.2% (Variable)* |
| Yeast | 33.3 | 2.5% |
| Yeast Food | 6.6 | 0.5% |
| Dough | Grams | % (Flour as 100) |
| Flour | 465 | 35.0% |
| Sugar | 106.3 | 8.0% |
| Salt | 26.6 | 2.0% |
| Shortening (Lard) | 40.0 | 3.0% |
| Nonfat Dry Milk Solids | 80.0 | 6.0% |
| Water | 372.0 | 28.2% (Variable)* |
| Emulsifier | 3.3-6.6 | 0.25-0.5 |

*57% of the total water in the above formula was added to the sponge and 43% of the total water was added to the dough. The total amount of water used varied depending upon the flour absorption properties. The amount of water required was determined by a farinograph method which is described in *Cereal Laboratory Methods* compiled by American Association of Cereal Chemists, 6th Edition, pp. 132-139.

Procedure

All ingredients are at room temperature (approximately 75° F.). The sponge ingredients are kneaded in a 10 qt. Hobart bowl, utilizing a standard dough hook, for 5 minutes at low speed. The yeast and yeast food are dissolved first in part of the sponge water, and added as liquids. The dough is fermented 4.5 hours at 86° F. and 75 percent R. H.

The fermented sponge is added to the mixer. Add the dough water. Place one-half of the dough flour on top of $H_2O$ and add all other ingredients except the shortening. Mix 2 minutes at medium speed. Add remainder of flour and shortening. The dough is mixed approximately 8 minutes more on medium speed—depending on the Farinograph results and flour used.

The dough is then fermented for 20 minutes at 86° F., 75 percent R. H.

After fermentation, the dough is divided into 18-ounce pieces, rounded, placed into bread pans and allowed a 10-minute proof at 86° F., 75 percent R. H.

After proofing, the dough is sheeted, moulded, sealed and placed into bread pans. The dough is then proofed at 100° F., 85 percent R. H. to template height (approximately 1⅛ inches in 55 to 60 minutes).

Bake at 425° F. for 20 minutes.

The volume (in cc.'s) of each loaf is measured in a loaf volumeter*. approximately 1 hour after baking. The loaves are then wrapped in cellophane (No. 300 MSD 53), sealed, and stored at room temperature (Ca. 76° F., 50 percent R. H.) for a period of 6 days.

*Method of volumetric measurement described in *Cereal Laboratory Methods* of American Association of Cereal Chemists, 17th Edition, method 10-10, using apparatus similar to that described in *Cereal Chemistry*, VII: 307 (1930) or *Cereal Chemistry* XV: 235 (1938).

After 3 days and 6 days of storage, the loaves are sliced (½-inch slices), using an Oliver Slicing Machine (No. 777). The middle five slices are used for testing on the *Instron\** electronic compressometer—the end slices are not used. Three readings are taken on each of the 5 slices—one in upper corner within one-half inch of crust, another on center of slice, and the third at the opposite bottom corner (one-half inch from bottom and sides). The slices are then observed for crumb grain, texture, color, and other visible characteristics.

*INSTRON model TM, Standard Speed, manufactured by Instron Corp.
Compression Load Cell #CB
Full Scale Load 1000 Grams.
Compressibility distance—4 mm. (0.16 inch)
Compression Plunger Disc—1 inch diameter
Crosshead Speed—(5 inches per minute)
Chart Speed—(20 inches per minute)

In determining the Instron values, the three readings per slice are averaged and then the values for the five slices are averaged to give a specific number for softness on that particular day. To calculate the softness index, with 1.00 for the control (unemulsified) bread, use the following calculation:

$$\text{Sample index} = \frac{\text{Reading of experimental sample}}{\text{Reading of control sample}}$$

Table I which follows exemplifies the results of the evaluation of the above-indicated monoglyceride/polyglycerol fatty acid ester surfactant blends as softeners when compared with a control bread and a conventional softener:

TABLE I

| Example | Surfactant | Blend ratio | Percent surfactant based on flour weight | Softness index (Instron) 6 days |
|---|---|---|---|---|
| | Control | | | 1.000 |
| | Monoglyceride B | | 0.5 | 0.880 |
| 1 | Monoglyceride B/decaglycerol monostearate | 80/20 | 0.5 | 0.755 |
| 2 | Monoglyceride B/hexaglycerol distearate | 60/40 | 0.5 | 0.790 |
| 3 | Monoglyceride A/decaglycerol monooleate | 80/20 | 0.5 | 0.790 |
| 4 | Monoglyceride A/decaglycerol monomyristate | 80/20 | 0.5 | 0.715 |
| 5 | Monoglyceride A/decaglycerol decalinoleate | 60/40 | 0.5 | 0.780 |
| 6 | do | 80/20 | 0.5 | 0.690 |
| 7 | Monoglyceride A/hexaglycerol cottonseed ester | 60/40 | 0.5 | 0.735 |
| 8 | Monoglyceride A/decaglycerol cottonseed ester | 80/20 | 0.5 | 0.735 |
| 9 | Monoglyceride A/triglycerol monostearate | 60/40 | 0.5 | 0.795 |
| 10 | do | 80/20 | 0.5 | 0.785 |

EXAMPLES 11-13

The following are further examples of a yeast-raised baked product prepared according to the method of the present invention conforming to the bread formula and procedures set forth in examples 1-10 save only that the level of surfactant blend in the formula were reduced by one-half. A control bread containing no surfactant and a comparison bread containing a conventional surfactant were prepared according to the same bread formula and procedures. The comparative results are set forth below in Table II:

TABLE II

| Example | Surfactant | Blend ratio | Percent surfactant based on flour weight | Softness index (Instron) 6 days |
|---|---|---|---|---|
|  | Control | | | 1.000 |
|  | Monoglyceride B | | 0.25 | 0.930 |
| 11 | Monoglyceride A/hexaglycerol cottonseed ester. | 80/20 | 0.25 | 0.785 |
| 12 | Monoglyceride A/decaglycerol decalinoleate. | 80/20 | 0.25 | 0.740 |
| 13 | Monoglyceride A/decaglycerol monomyristate. | 80/20 | 0.25 | 0.790 |

In recent years, the traditional "batch" method of producing bread has been supplanted in numerous bakeries by continuous breadmaking processes which have been developed for the continuous production of finished loaves of bread. In these processes, the essential ingredients of the bread are fed continuously into automatic apparatus for the production of bread dough wherein, blending, fermentation and mixing of said ingredients into a suitable bread dough is accomplished, after which the dough is itself automatically divided and panned ready for baking. In a typical continuous breadmaking process, for example, a brew or broth is prepared by blending together water, yeast, yeast food and liquid sugar and passing the resulting mixture to a "brew tank" where it is allowed to ferment for the production of yeast and flavor in the end product. Thereafter, the resulting brew is passed through successive stages into an incorporator wherein shortening and flour are added to the brew and preliminarily mixed therewith under pressure to form a homogeneous mass called a premix. The premix is then pumped under pressure into a developer wherein the premix is subjected to vigorous mixing to develop it into a uniform properly finished dough. Finally, the dough is passed to a dividing and panning device wherein it is accurately divided and panned.

Not infrequently the above-described process is modified by the addition of salt, milk, more sugar and up to about 50 percent of the flour to the brew tank to form a liquid "sponge" which may be in part recycled to "seed" the following brew prior to its passage to a liquid sponge trough where additional liquid sugar is added to insure the presence of unfermented sugar in the liquid sponge. The liquid sponge may then be passed through a heat exchanger to the incorporator where the balance of the flour is added and the premix formed.

The following is a specific example of a process of continuous bread-making according to the method of the present invention:

EXAMPLE 11

The process is carried out in continuous breadmaking equipment which comprises an initial blending tank, holding tanks for the brew, a heat exchanger, an oxidant tank, a shortening tank and a flour feeder or hopper communicating with an incorporator or premixer, a developer or high speed mixer and finally a divider and panner. Each of the foregoing elements positioned in the order stated, communicates with adjacent elements by means of conduits adapted for the passage therethrough of bread dough ingredients. The conduits are supplied with suitable pumps for moving said ingredients through said conduits.

The following bread formula is used for the continuous production of bread through the equipment described above:

Brew Formula

| Ingredient | % | Grams |
|---|---|---|
| Flour | 30 | 1800 |
| Water | 67 | 4020 |
| Sugar | 8 | 480 |
| Nonfat dry milk | 2 | 120 |
| Yeast | 2.5 | 150 |
| Salt | 2.3 | 138 |
| Nonphosphate yeast food | 0.5 | 30 |
| Calcium acid phosphate | 0.2 | 12 |
| Calcium propionate | 0.1 | 6 |

The brew is allowed to ferment in the holding tanks for a period of 2 ½ hours at a temperature of 86° F.

Dough Formula

| Ingredient | % | Grams |
|---|---|---|
| Flour | 70 | 4200 |
| Water | 3.25 | 195 |
| Shortening | 3.0 | 180 |
| Emulsifier blend | 0.25 | 15 |
| Oxidation solution: | | |
| Potassium Bromate | | 50 p.p.m. |
| Oxidation solution: | | |
| Potassium Iodate | | 12.5 p.p.m. |

The shortening comprises 94.03 percent lard and 5.97 percent fully hydrogenated cottonseed flakes. The surfactant composition is a blend of 80 percent by weight of a monoglyceride which comprises monoglycerides and diglycerides (Ca. 54 percent alpha mono) of fat-forming fatty acids from hydrogenated tallow and 20 percent Decaglycerol decalinoleate. The shortening and emulsifier blends are blended together to form a homogeneous mass by melting the emulsifier into the shortening.

Bread is made according to the formula set forth above in a continuous bread-making process wherein ingredients of the brew formula after fermentation are passed through a heat exchanger to an incorporator in which a premix is made by the addition of the ingredients of the dough formula. The premix is passed to the developer (175 r.p.m.) where the final dough is formed by vigorous mixing. After dividing and panning, the dough is baked at 410° F. for 18 minutes.

The following are further specific examples of antistalant surfactant compositions which may be used in the preparation of a yeast-raised baked product according to the methods of the present invention.

EXAMPLES 12-20

| Emulsifier composition | Ratio | Concentration [1] |
|---|---|---|
| Monoglyceride A/triglycerol tristearate | 50/50 | 0.25 |
| Monoglyceride B/nonaglycerol monopalmitate | 70/30 | 0.15 |
| Monoglyceride A/hexaglycerol monolauroleate | 80/20 | 0.50 |
| Monoglyceride A/decaglycerol pentaricinoleate | 45/55 | 0.30 |
| Monoglyceride B/duodecaglycerol decapalmitate | 75/25 | 0.20 |
| Monoglyceride B/duinauedecaglycerol quattordecastearate | 65/35 | 0.25 |
| Monoglyceride A/decaglycerol decalinoleate | 40/60 | 0.50 |
| Monoglyceride B/decaglycerol cottonseed ester | 55/45 | 0.40 |
| Monoglyceride A/decaglycerol duodecalinoleate | 50/50 | 0.35 |

[1] Percent emulsifier based on flour weight in product.

Having thus described our invention, we claim:

1. In a method of preparing a yeast-raised baked product which comprises preparing a dough and baking the dough, the improvement which comprises adding to the dough ingredients from about 0.15 percent to about 1.0 percent by weight of flour in said ingredients of a surfactant blend comprising from about 40 percent by weight to about 80 percent by weight of a monoglyceride and from about 20 percent by weight to about 60 percent by weight of a polyglycerol ester of a fatty acid, the fatty acid moiety of said esters being derived from fatty acids containing from about 12 to about 22 carbon atoms and the mole ratio of glycerine in said polyglycerol ester to said ester being within the range of about 5 to 1 to about 15 to 1.

2. A method according to claim 1 wherein said monoglyceride is prepared from fat-forming fatty acids from partially hydrogenated tallow.

3. A method according to claim 1 wherein said polyglycerol ester is decaglycerol decalinoleate.

4. A yeast-raised baked product which comprises from about 0.15 percent to about 1.0 percent by weight of flour in said product of a surfactant blend comprising from about 40 percent by weight to about 80 percent by weight of a monoglyceride and from about 20 percent by weight to about 60 percent by weight of a polyglycerol ester of a fatty acid, the fatty acid moiety of said esters being derived from fatty acids containing from about 12 to about 22 carbon atoms and the mole ratio of glycerine in said polyglycerol ester to said ester being within the range of about 5 to 1 to about 15 to 1.

5. A yeast-raised product according to claim 4 which contains a surfactant blend of monoglyceride and decaglycerol decalinoleate in a ratio of about 80 percent by weight to about 20 percent by weight respectively, the concentration of said surfactant blend in said product being within the range of about 0.25 percent to about 0.5 percent based upon the weight of flour in said product.

6. A yeast-raised product according to claim 5 wherein said concentration of said surfactant blend is about 0.25 percent based upon the weight of flour in said product.

* * * * *